US012037834B2

(12) United States Patent
Asami et al.

(10) Patent No.: US 12,037,834 B2
(45) Date of Patent: Jul. 16, 2024

(54) LOCK RELEASE CONTROL DEVICE FOR OPENING AND CLOSING BODY

(71) Applicant: AISIN CORPORATION, Kariya (JP)

(72) Inventors: Ryo Asami, Kariya (JP); Noriyuki Kamiya, Kariya (JP); Kohei Kobayashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 212 days.

(21) Appl. No.: 17/808,133

(22) Filed: Jun. 22, 2022

(65) Prior Publication Data

US 2023/0015844 A1 Jan. 19, 2023

(30) Foreign Application Priority Data

Jul. 14, 2021 (JP) ................................ 2021-116551

(51) Int. Cl.
*B60J 5/04* (2006.01)
*E05F 15/659* (2015.01)

(52) U.S. Cl.
CPC ......... *E05F 15/659* (2015.01); *E05Y 2201/22* (2013.01); *E05Y 2201/41* (2013.01); *E05Y 2201/422* (2013.01); *E05Y 2201/688* (2013.01); *E05Y 2400/36* (2013.01); *E05Y 2900/531* (2013.01)

(58) Field of Classification Search
CPC ......... E05F 15/659; E05F 15/646; B60J 5/06; E05B 83/40
See application file for complete search history.

(56) References Cited

U.S. PATENT DOCUMENTS

2004/0074148 A1* 4/2004 Her ...................... E05F 15/646 49/324
2004/0267425 A1* 12/2004 Suzuki ................... E05F 15/40 701/49
2017/0081897 A1* 3/2017 Kaino .................... H04W 4/40

FOREIGN PATENT DOCUMENTS

JP 4-68182 U 6/1992
JP 2016-98612 A 5/2016

* cited by examiner

*Primary Examiner* — Muhammad S Islam
(74) *Attorney, Agent, or Firm* — Oblon, McClelland, Maier & Neustadt, L.L.P.

(57) ABSTRACT

A lock release control device for an opening and closing body configured to control an opening and closing body that opens and closes an opening portion of a vehicle. The opening and closing body comes into contact with a sealing member provided on a vehicle body side of the vehicle in a fully closed state. The vehicle includes a locking device and an opening and closing actuator. The locking device restrains the opening and closing body in a fully closed position. The opening and closing actuator displaces the opening and closing body by rotation of a motor to change the opening and closing body from one of two states including an open state and a closed state to another of the states. The lock release control device is configured to execute an open command acquisition process, a pull-in process, and a lock release process.

6 Claims, 8 Drawing Sheets

LOCK RELEASE CONTROL DEVICE FOR OPENING AND CLOSING BODY

CROSS REFERENCE TO RELATED APPLICATIONS

This application is based on and claims priority under 35 U.S.C. § 119 to Japanese Patent Application 2021-116551, filed on Jul. 14, 2021, the entire content of which is incorporated herein by reference.

TECHNICAL FIELD

This disclosure relates to a lock release control device for an opening and closing body.

BACKGROUND DISCUSSION

For example, JP-UM-A-4-68182 (Reference 1) discloses a control device that executes control for releasing lock of a sliding door as an opening and closing body of a vehicle. When releasing the lock of the door, the control device executes a process of further displacing the door to a closing side. This is intended to reduce a force required for releasing the lock by reducing a reaction force exerted on the door by a sealing member provided in an opening portion.

However, when the opening and closing body is further displaced to the closing side from a fully closed position of the opening and closing body as described above, a user may feel a sense of discomfort.

SUMMARY

1. A lock release control device for an opening and closing body is configured to control an opening and closing body that opens and closes an opening portion of a vehicle. The opening and closing body comes into contact with a sealing member provided on a vehicle body side of the vehicle in a fully closed state. The vehicle includes a locking device and an opening and closing actuator. The locking device is a device that restrains the opening and closing body in a fully closed position. The opening and closing actuator is an actuator that displaces the opening and closing body by rotation of a motor to change the opening and closing body from one of two states including an open state and a closed state to another of the states. The lock release control device is configured to execute an open command acquisition process, a pull-in process, and a lock release process. The open command acquisition process is a process of acquiring a command to bring the opening and closing body to the open state. The pull-in process includes a closing rotation process of controlling the rotation of the motor to further displace the opening and closing body in a closing direction when the command to bring the opening and closing body to the open state is acquired, and at least one process of a voltage gradual change process or a prevention process. The lock release process is a process of operating the locking device to release restraint of the opening and closing body at the fully closed position when the command to bring the opening and closing body to the open state is acquired. The voltage gradual change process is a process of gradually increasing a voltage applied to the motor upon start of the closing rotation process. The prevention process is a process of preventing further displacement of the opening and closing body when the motor rotates by a predetermined amount due to the closing rotation process.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Hereinafter, a first embodiment will be described with reference to the drawings.

Figure 1:
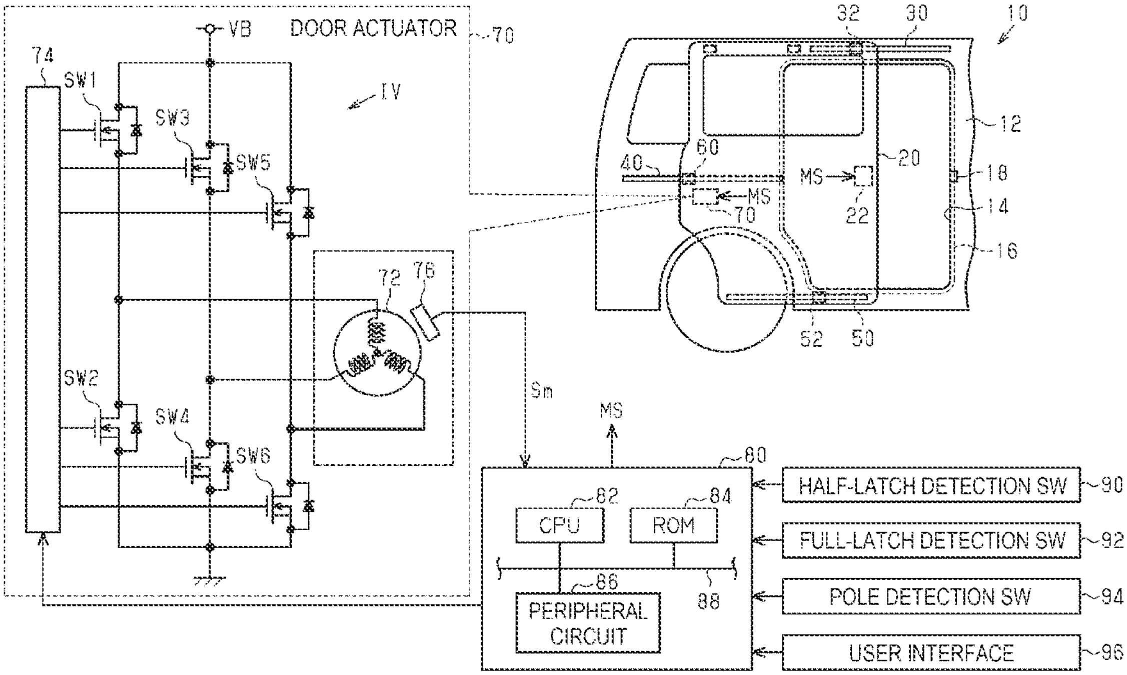
FIG. 1 is a diagram showing a sliding door and a control device thereof according to a first embodiment.

As shown in FIG. 1, a vehicle 10 includes a vehicle body 12 and a sliding door 20. An opening portion 14 is provided on a side portion of the vehicle body 12. Further, the opening portion 14 of the vehicle body 12 is provided with a weather strip 16 as a sealing member that improves sealing performance when the sliding door 20 closes the opening portion 14. The vehicle body 12 includes a striker 18 at a central portion in a vertical direction of a front end of the opening portion 14. The striker 18 has a substantially U shape and protrudes rearward. The sliding door 20 opens and closes between a fully closed position in which the opening portion 14 is fully closed and a fully open position in which the opening portion 14 is fully open. In the present embodiment, the sliding door 20 is moved rearward to open, and the sliding door 20 is moved forward to close. The sliding door 20 includes a door locking device 22. The door locking device 22 restrains the sliding door 20 in the fully closed position by engaging with the striker 18 when the sliding door 20 is positioned in the fully closed position.

The vehicle body 12 is provided with an upper rail 30, a center rail 40, and a lower rail 50. The upper rail 30 is disposed above the opening portion 14. The center rail 40 is disposed behind the opening portion 14. The lower rail 50 is disposed below the sliding door 20. The sliding door 20 is coupled to the upper rail 30, the center rail 40, and the lower rail 50 via coupling members 32, 60, and 52, respectively.

Figure 2A:
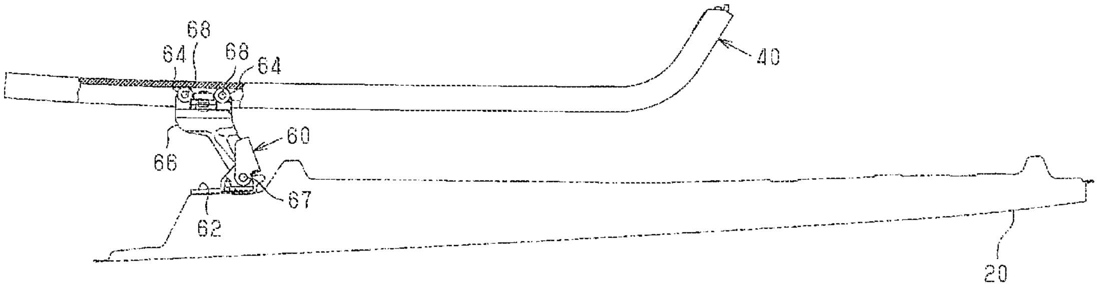
FIG. 2A shows the sliding door in an open state according to the same embodiment.
Figure 2B:
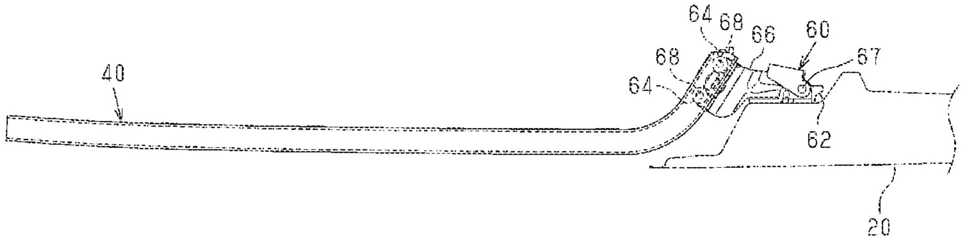
FIG. 2B shows the sliding door in a closed state.

FIGS. 2A and 2B each shows a mechanical coupling state of the sliding door 20 and the center rail 40 by the coupling member 60.

The coupling member 60 includes a fixing portion 62, a guide roller support portion 66, and guide rollers 64. The fixing portion 62 is fixed to the sliding door 20. The guide roller support portion 66 is rotatably coupled to the fixing portion 62. The guide rollers 64 are rotatably supported by the guide roller support portion 66.

In the coupling member 60, the fixing portion 62 is fixed to a position near a rear end of the central portion of the sliding door 20 in the vertical direction. The guide roller support portion 66 is coupled to the fixing portion 62 to be able to be relatively displaced with a rotation shaft 67 extending in the vertical direction as a center of rotation. The guide rollers 64 are arranged in a direction orthogonal to the vertical direction.

In a state in which the coupling member 60 is coupled to the center rail 40, the guide rollers 64 are disposed between side walls of the center rail 40. When the coupling member 60 moves with respect to the center rail 40 in a longitudinal direction of the center rail 40, each of the guide rollers 64 rotates in a state of being in contact with the side walls of the center rail 40, with a rotation shaft 68 extending in the vertical direction as a center of rotation.

FIG. 2A shows a state in which the sliding door 20 is at the fully open position. FIG. 2B shows a state in which the sliding door 20 is at the fully closed position.

Figure 3A:
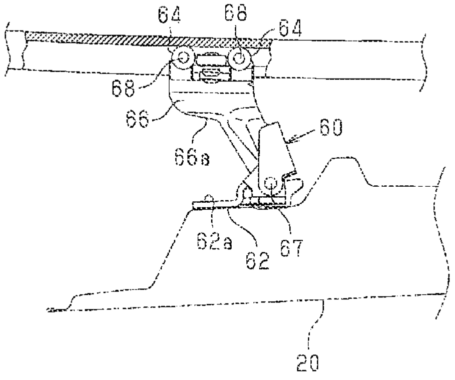
FIGS. 3A and 3B are diagrams showing a side surface configuration of a coupling member according to the same embodiment.
Figure 3B:
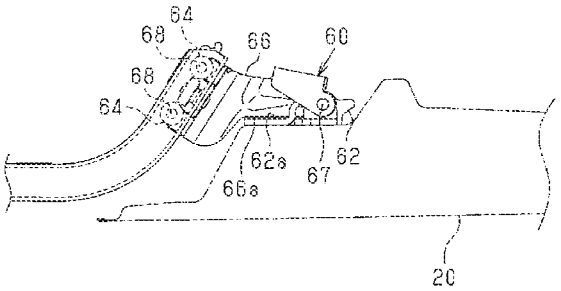

FIGS. 3A and 3B show enlarged diagrams of the coupling member 60. Specifically, FIG. 3A shows a fully open state of the sliding door 20. FIG. 3B shows a fully closed state of the sliding door 20.

As the sliding door 20 is displaced to the fully closed position by rotating the guide rollers about the rotation shafts 68, the guide roller support portion 66 rotates relative to the fixing portion 62 about the rotation shaft 67. As the sliding door 20 is displaced to the fully closed position, an angle formed by closing-side facing surfaces 62*a* and 66*a* of the fixing portion 62 and the guide roller support portion 66 is reduced. Then, as shown in FIG. 3B, at the fully closed position of the sliding door 20, the closing-side facing surfaces 62*a* and 66*a* face each other at a position immediately before coming into contact with each other.

Returning to FIG. 1, the vehicle 10 includes a door actuator 70. The door actuator 70 includes a motor 72, an inverter IV, and a controller 74. The motor 72 transmits power to the sliding door 20 via, for example, a wire or a belt. Whether the sliding door 20 is subjected to the closing operation or the opening operation is determined by a rotation direction of the motor 72.

The motor 72 is a three-phase brushless motor. In the inverter IV, a series connection body of switching elements SW1 and SW2, a series connection body of switching elements SW3 and SW4, and a series connection body of switching elements SW5 and SW6 are connected in parallel. A battery voltage, which is a DC voltage source, is applied to these series connection bodies. The controller 74 turns on and off the switching elements SW1 to SW6.

A control device 80 operates the door locking device 22 and the door actuator 70 in order to control the open and closed states of the sliding door 20 as a control target. For such control, the control device 80 refers to an output signal Sm of a rotation angle sensor 76 that senses a rotation angle of the motor 72. The output signal Sm has a waveform that generates a pulse each time the motor 72 reaches a predetermined rotation angle. Further, the control device 80 refers to an output signal of a half-latch detection switch 90, an output signal of a full-latch detection switch 92, and an output signal of a pole detection switch 94. Here, the half-latch detection switch 90 is a switch that detects that the sliding door 20 is at a so-called door ajar position based on a state of a latch included in the door locking device 22. The full-latch detection switch 92 is a switch that detects that the sliding door 20 is at the fully closed position based on the state of the latch. The pole detection switch 94 is a switch that detects that a position of the latch reaches a predetermined position on a release side.

In the control device 80, a CPU 82, a ROM 84, and a peripheral circuit 86 can communicate with each other via a communication line 88. Here, the peripheral circuit 86 includes a circuit that generates a clock signal that defines an internal operation, a power supply circuit, a reset circuit, and the like. The control device 80 performs opening and closing control of the sliding door 20 by the CPU 82 executing a program stored in the ROM 84. In particular, when a user of the vehicle 10 operates a user interface 96 to issue a command to bring the sliding door 20 from the fully closed state to an open state, the CPU 82 performs the opening control of the sliding door 20.

Figure 4:
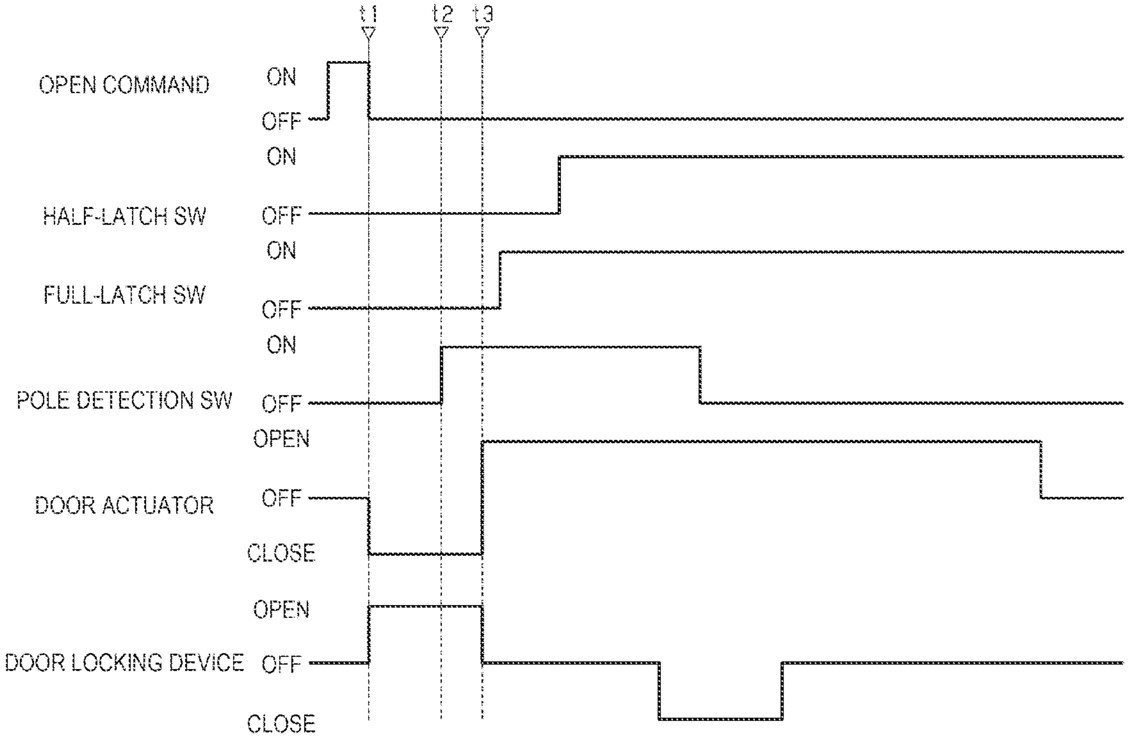
FIG. 4 is a time chart showing opening control of the sliding door according to the same embodiment.

FIG. 4 shows the opening control of the sliding door 20. As shown in FIG. 4, when the command to open the sliding door 20 is issued, the CPU 82 operates the door locking device 22 to an open side and further operates the door actuator 70 to a closing side at a time t1. That is, the motor 72 is rotated to a closing operation side of the sliding door 20. This operation is a process for reducing a force of the weather strip 16 pushing toward a side of opening the sliding door 20 when releasing a locked state by the door locking device 22. Accordingly, at a time t2, the pole detection switch 94 detects that the latch of the door locking device 22 is displaced to a predetermined position in a release direction. Then, the CPU 82 inverts the motor 72 and subjects the sliding door 20 to the opening operation at a time t3 when a predetermined time is elapsed from the time t2.

However, when the sliding door 20 is temporarily subjected to closing operation for lock releasing as described above, the sliding door 20 pushes the weather strip 16 and is further displaced in a closing direction. Accordingly, the closing-side facing surface 62*a* of the fixing portion 62 and the closing-side facing surface 66*a* of the guide roller support portion 66 shown in FIGS. 3A and 3B may collide with each other to generate an abnormal noise. Further, when an elastic force of the weather strip 16 is reduced due to aged deterioration, the sliding door 20 may be displaced in the closing direction to an extent that can be perceived by the user.

Therefore, in the present embodiment, the process of releasing the locked state of the sliding door 20 at the fully closed position, which is control in a period from the time t1 to the time t3, is executed as follows.

Figure 5:
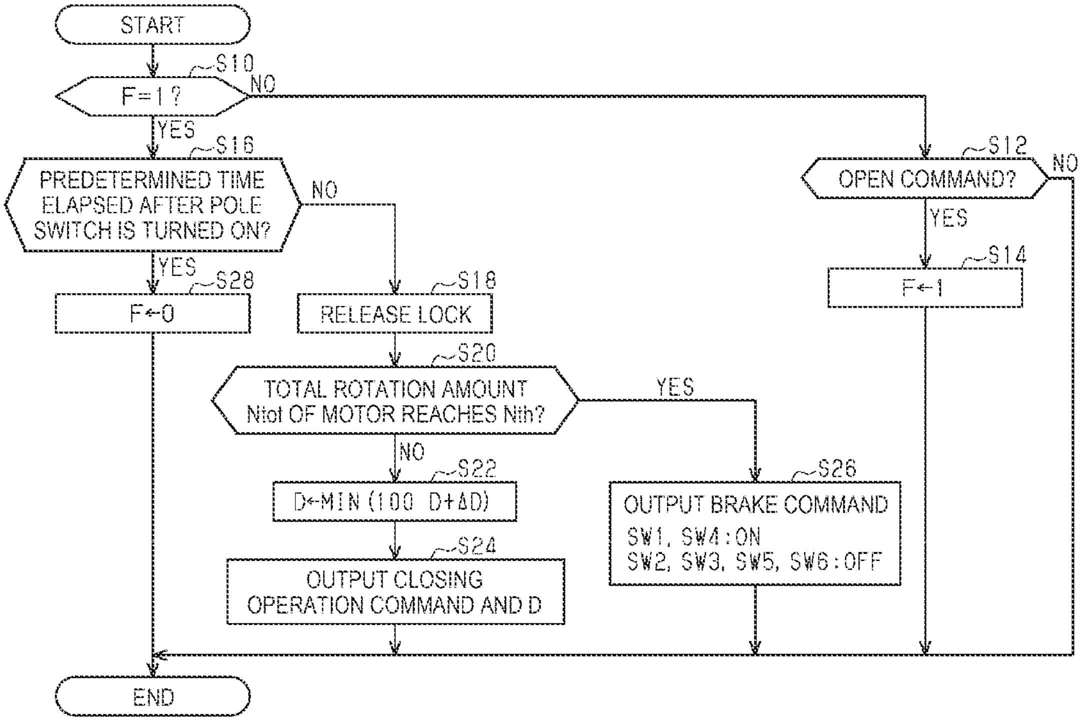
FIG. 5 is a flowchart showing a processing procedure of the opening control of the sliding door according to the same embodiment.

FIG. 5 shows a procedure of the process related to the release. The process shown in FIG. 5 is implemented by the CPU 82 repeatedly executing a program stored in the ROM 84 at a predetermined cycle, for example. In the following description, a step number of each process is expressed by a numeral to which "S" is assigned to the head.

In a series of processes shown in FIG. 5, the CPU 82 first determines whether a flag F is "1" (S10). The flag F is "1" when the process of releasing the locked state of the sliding door 20 at the fully closed position is executed, and is "0" when the process is not executed. When the CPU 82 determines that the flag F is "0" (S10: NO), the CPU 82 determines whether the command (open command) to open the sliding door 20 is issued by the operation of the user interface 96 (S12). When the CPU 82 determines that the open command is issued (S12: YES), the CPU 82 assigns "1" to the flag F (S14).

On the other hand, when the CPU 82 determines that the flag F is "1" (S10: YES), the CPU 82 determines whether the predetermined time is elapsed after the pole detection switch 94 is turned on (S16). This process is a process of determining whether the time t3 in FIG. 4 is reached. When the CPU 82 determines that the predetermined time is not elapsed (S16: NO), the CPU 82 releases the lock using the door locking device 22 (S18). Next, the CPU 82 determines whether a total rotation amount Ntot of the motor 72 reaches a threshold Nth (S20). The threshold Nth is set to be equal to or less than an upper limit value at which the user does not feel a sense of discomfort that the sliding door 20 is displaced in the closing direction. When the CPU 82 determines that the threshold Nth is not reached (S20: NO), the CPU 82 substitutes a smaller value of 100 and a value obtained by adding an increase amount ΔD to a time ratio D into the time ratio D (S22). The time ratio D is a ratio of on-time to a cycle in which the switching elements SW2, SW4, and SW6 are periodically turned on and off. This process is a process of increasing the time ratio D by the increase amount of ΔD toward 100%.

Figure 6:
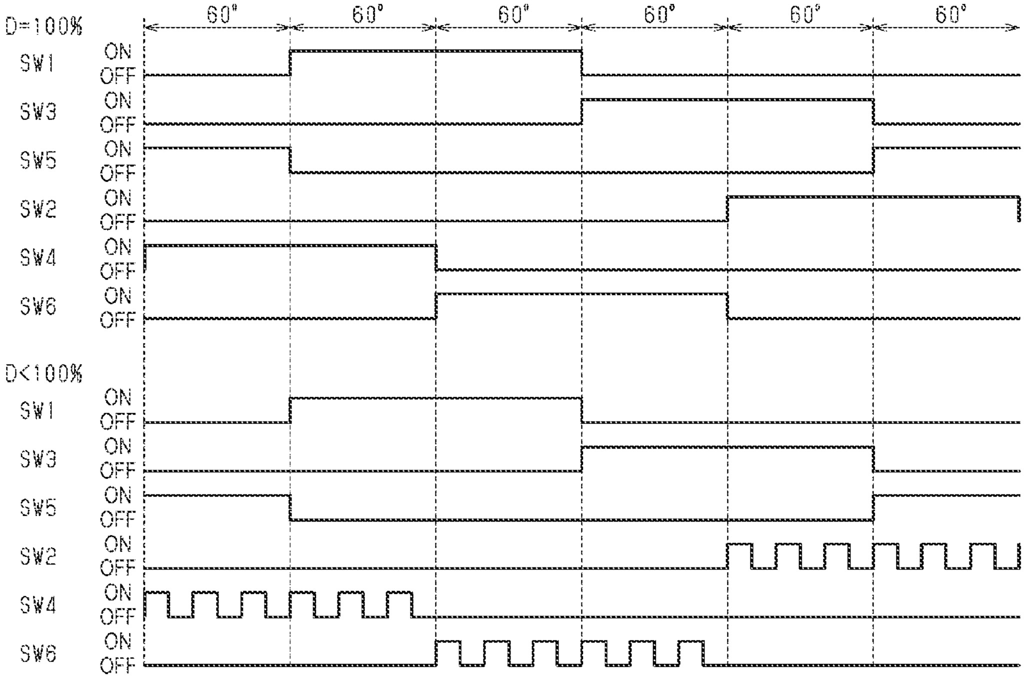
FIG. 6 is a time chart showing a switching method of an inverter according to the same embodiment.

As shown in FIG. 6, when the time ratio D is 100%, the switching elements SW1 to SW6 of the inverter IV are turned on in accordance with a 120° energization method. That is, the switching elements SW1 to SW6 are set to an on state by 120° at different phases from one another during 360°.

On the other hand, when the time ratio D is smaller than 100%, the switching elements SW2, SW4, and SW6 are periodically turned on and off during a period in which the switching elements SW2, SW4, and SW6 are turned on when the time ratio D is 100%. The cycle here is a PWM cycle, and a ratio of the on-time to the PWM cycle is the time ratio D. According to this process, an effective value of the voltage applied to the motor 72 can be increased as the time ratio D increases.

Therefore, a process of S22 of FIG. 5 is a process of gradually increasing the effective value of the voltage applied to the motor 72.

Returning to FIG. 5, the CPU 82 outputs a closing operation command signal, which is a command for subjecting the sliding door 20 to the closing operation, and the time ratio D to the controller 74 (S24). Accordingly, the controller 74 operates the switching elements SW2, SW4, SW6 in accordance with the time ratio D.

On the other hand, when the CPU 82 determines that the total rotation amount Ntot reaches the threshold Nth (S20: YES), the CPU 82 outputs a brake command for fixing the rotation angle of the motor 72 to the controller 74 (S26). Accordingly, the controller 74 executes a process of setting the switching elements SW1 and SW4 to the on state and setting the switching elements SW2, SW3, SW5 and SW6 to an off state. Accordingly, the rotation angle of the motor 72 is fixed to a predetermined angle determined by a switching pattern described above.

When the CPU 82 determines that the predetermined time is elapsed (S16: YES), the CPU 82 assigns "0" to the flag F (S28).

When the processes of S14, S24, S26, and S28 are completed and when a negative determination is made in the process of S12, the CPU 82 temporarily ends the series of processes shown in FIG. 5.

Here, operations and effects of the present embodiment will be described.

When the command to open the sliding door 20 is issued while the sliding door 20 is in the fully closed state, the CPU 82 releases the locked state by the door locking device 22. Further, the CPU 82 operates the door actuator 70 to subject the sliding door 20 to the closing operation. Accordingly, the force subjecting the sliding door 20 to the opening operation that is exerted on the sliding door 20 by the weather strip 16 can be reduced. Therefore, the force required when the door locking device 22 releases the locked state is reduced. Accordingly, it is possible to prevent generation of the abnormal noise caused by the door locking device 22 releasing the locked state.

When subjecting the sliding door 20 to the closing operation, the CPU 82 gradually increases the effective value of the voltage applied to the motor 72. Accordingly, an acceleration applied to the sliding door 20 is reduced as compared with a case where the effective value is increased stepwise. Therefore, it is possible to reduce an impact when the closing-side facing surface 62*a* of the fixing portion 62 and the closing-side facing surface 66*a* of the guide roller support portion 66, which face each other, come into contact with each other. Therefore, it is possible to prevent the user from perceiving the abnormal noise.

Further, when the total rotation amount Ntot of the motor 72 after start of the closing operation of the sliding door 20 reaches the threshold Nth, the CPU 82 fixes the rotation angle of the motor 72. Accordingly, even when a force against the closing operation of the sliding door 20 is reduced due to the aged deterioration of the weather strip 16, it is possible to prevent the sliding door 20 from being excessively displaced.

Figure 7A:
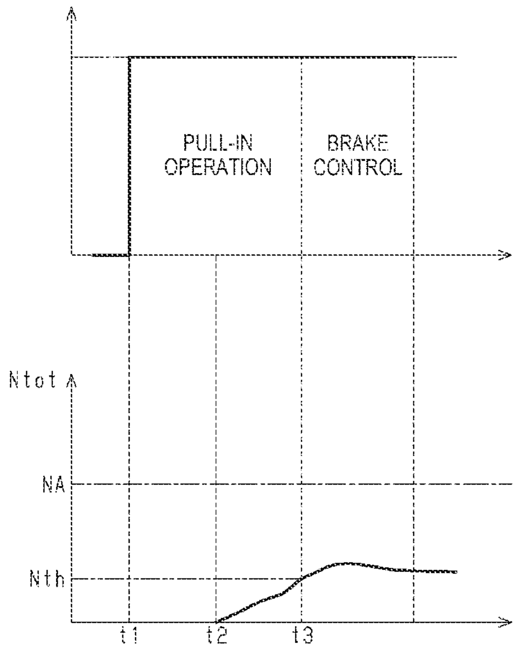
FIGS. 7A and 7B are time charts showing transition in a rotation amount of a motor in the same embodiment and a comparative example.
Figure 7B:
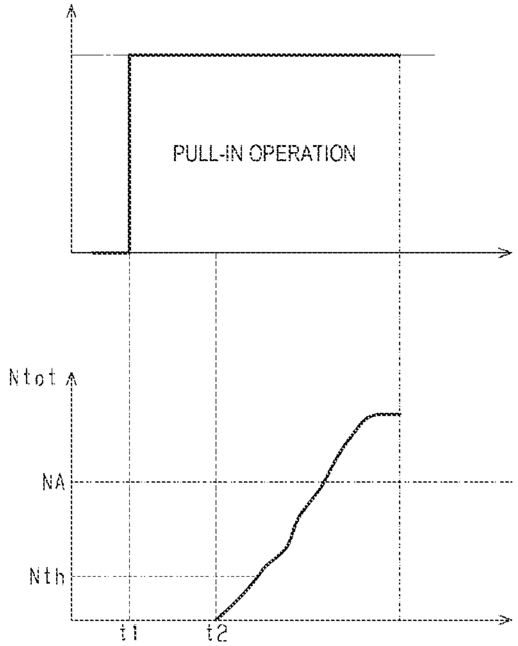

FIGS. 7A and 7B show the total rotation amount Ntot when the force against the closing operation of the sliding door 20 is reduced due to the aged deterioration of the weather strip 16.

FIG. 7A shows a transition of the total rotation amount Ntot according to the present embodiment. As shown in FIG. 7A, an operation of the inverter IV is started to drive the motor 72 in a closing operation direction at the time t1. In FIGS. 7A and 7B, this process is referred to as a "pull-in operation". Accordingly, since a pulse of the output signal Sm of the rotation angle sensor 76 is detected after the time t2, the CPU 82 increases the total rotation amount Ntot. Then, when the total rotation amount Ntot reaches the threshold Nth at the time t3, the CPU 82 fixes the rotation angle of the motor 72. Accordingly, the total rotation amount Ntot can be prevented from reaching an amount NA of displacement of the sliding door 20 such that the user feels the sense of discomfort.

FIG. 7B shows a transition of the total rotation amount Ntot when the processes of S20 and S26 are not performed. As shown in FIG. 7B, in this case, when the force by the weather strip 16 against the closing operation of the sliding door 20 is reduced, the total rotation amount Ntot exceeds the above amount NA. Therefore, the user may feel the sense of discomfort when the user perceives that the sliding door 20 is displaced in a direction opposite to an intended direction even though the command to open the sliding door 20 is issued.

Second Embodiment

Hereinafter, a second embodiment will be described with reference to the drawings, focusing on differences from the first embodiment.

Figure 8:
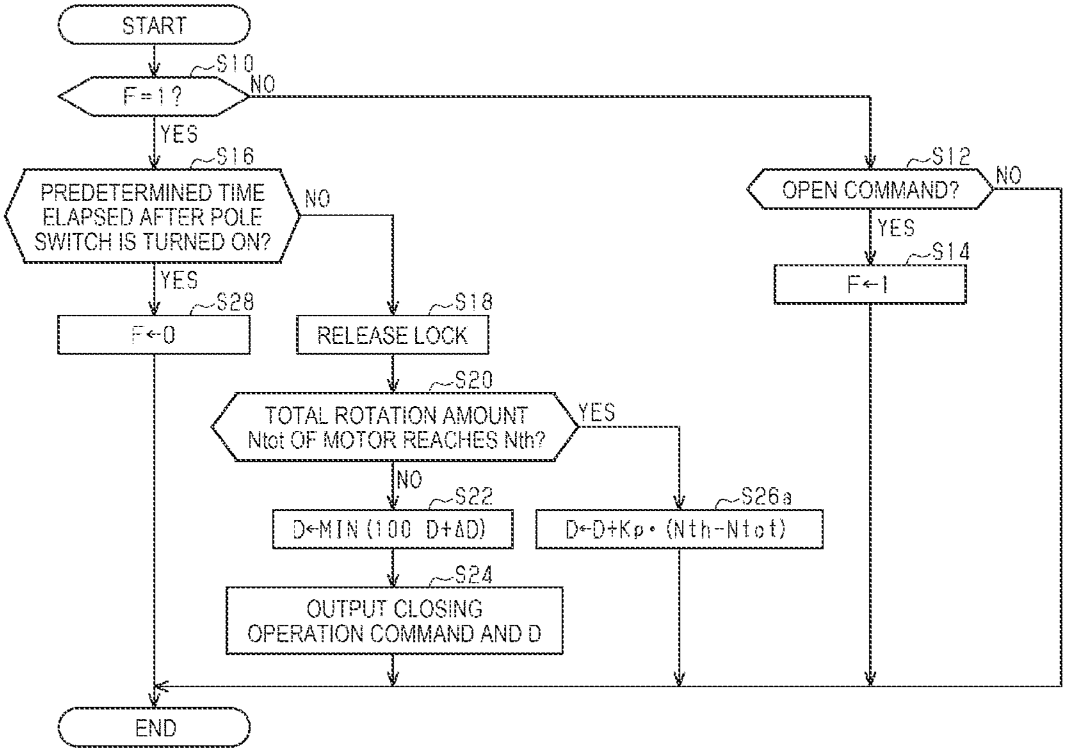
FIG. 8 is a flowchart showing a processing procedure of opening control of a sliding door according to a second embodiment.

FIG. 8 shows a procedure of the process relating to the release according to the present embodiment. The process shown in FIG. 8 is implemented by the CPU 82 repeatedly executing a program stored in the ROM 84 at the predetermined cycle, for example. In FIG. 8, the same step numbers are assigned to the processes corresponding to the processes shown in FIG. 5 for the sake of convenience.

In the series of processes shown in FIG. 8, when an affirmative determination is made in the process of S20, the CPU 82 feedback-controls the total rotation amount Ntot to the threshold Nth (S26*a*). That is, a value obtained by multiplying a value obtained by subtracting the total rotation amount Ntot from the threshold Nth by a gain Kp is added to the time ratio D.

When the process of S26*a* is completed, the CPU 82 temporarily ends the series of processes shown in FIG. 8.

According to the above process, it is possible to prevent the total rotation amount Ntot from largely exceeding the threshold Nth.

Correspondence Relationship

A correspondence relationship between matters in the above embodiment and matters described in the "Solution to Problem" column below is as follows. In the following, the correspondence relationship is shown for each number of the solutions described in the column of "Solution to Problem". [1, 4] The lock release control device corresponds to the control device 80. The opening and closing body corresponds to the sliding door 20. The sealing member corresponds to the weather strip 16. The lock device corresponds to the door locking device 22. The opening and closing actuator corresponds to the door actuator 70. The motor corresponds to the motor 72. The open command acquisition process corresponds to the process of S12. The closing rotation process corresponds to the process of S24 when S22 is performed. The voltage gradual change process corresponds to the process of S22. The prevention process corresponds to the processes of S26 and S26*a*. [2] The guide rail corresponds to the center rail 40. The coupling member corresponds to the coupling member 60. The guide roller corresponds to the guide roller 64. The guide roller support portion corresponds to the guide roller support portion 66. The fixing portion corresponds to the fixing portion 62. The rotation shaft of the guide roller corresponds to the rotation shaft 68. The "same rotation shaft" corresponds to the rotation shaft 67. The closing-side facing surface of the guide roller support portion corresponds to the closing-side facing surface 66*a*. The closing-side facing surface of the fixing portion corresponds to the closing-side facing surface 62*a*. [3] The switching elements correspond to the switching elements SW1 to SW6. [5] The first phase corresponds to a phase including the switching element SW1. The second phase corresponds to a phase including the switching element SW4. The prevention process corresponds to the process of S26. [6] The prevention process corresponds to the process of S26*a*.

Other Embodiments

The present embodiment can be modified and implemented as follows. The present embodiment and the following modifications can be implemented in combination with each other within a technically consistent range.

Regarding Voltage Gradual Change Process

- In FIGS. 5 and 8, the time ratio D is updated in an execution cycle of the series of processes shown in these drawings, but the embodiment disclosed here is not limited thereto. For example, the process of S20 may be executed each time processes other than the process of S22 of the series of processes are executed a predetermined number of times. When this case is the process of gradually increasing the time ratio D, the processes shown in FIGS. 5 and 8 can be regarded as processes of continuously increasing the time ratio.
- Operation targets of the time ratio D are not limited to the switching elements SW2, SW4, and SW6 of a lower arm. For example, the switching elements SW1, SW3, and SW5 of an upper arm may also be operation targets.
- The PWM process is not limited to a process that uses a period during which the switching element is set to the on state in the 120° energization method. For example, the PWM process may be a process that uses a period during which the switching element is set to the on state in a 180° energization method.
- The voltage gradual change process is not limited to a process premised on a process of outputting a rectangular wave voltage from the inverter IV. For example, the voltage gradual change process may be a process of outputting a voltage in a form of a sine wave from the inverter IV. In this case, the process of gradually increasing the voltage can be implemented by a process of gradually increasing an amplitude of the voltage in the form of a sine wave. An operation signal used for the operation of the switching elements SW1 to SW6 in that case can be generated by a well-known triangular wave PWM process or the like.
- For example, when a DC motor is used as the motor as described in a column of "Regarding Motor" described later, the time ratio D of the switching element of an H-bridge circuit connected to the motor may be gradually increased. Accordingly, the effective value of the voltage applied to the motor can be gradually increased.
- The voltage gradual change process is not limited to a process implemented by a switching operation of a drive circuit that applies a voltage to the motor. For example, the voltage gradual change process may be a process of increasing a boosted voltage by providing a booster circuit for boosting an input voltage of the inverter IV.

Regarding Prevention Process

- In the above embodiment, the total rotation amount Ntot is calculated based on the output signal of the rotation angle sensor 76, but the embodiment disclosed here is not limited thereto. For example, a linear position sensor that detects a displacement amount of the sliding door 20 may be provided and the total rotation amount Ntot may be calculated based on an output signal of the linear position sensor.
- In the process of S26, it is determined in advance that the switching element SW1 and the switching element SW4 are set to the on state, but the embodiment disclosed here is not limited thereto. For example, the switching element set to the on state may be changed according to the rotation angle of the motor 72 at the time when it is determined that the total rotation amount Ntot reaches the threshold Nth. In that case, a combination that minimizes the rotation amount from the time of the same determination may be selected among six combinations of the switching elements of one phase of the upper arm and another one phase of the lower arm.
- The process of feedback-controlling the total rotation amount Ntot to the threshold Nth is not limited to the process of S26*a*. In other words, the process is not limited to a process in which an output value of a proportional element that inputs a difference between the total rotation amount Ntot and the threshold Nth is used as an operation amount for the feedback control. For example, the process may be a process in which an output value of an integral element that inputs the above difference is used as the operation amount for the feedback control.

The process of feedback-controlling the total rotation amount Ntot is not limited to a process of setting the threshold Nth as a target value. For example, the process may be a process of increasing or decreasing the time ratio D when the total rotation amount Ntot deviates from a predetermined range.

The process of fixing the rotation angle of the motor 72 is not limited to the processes of S26 and S26*a* and the processes described in the above modifications. In other words, the process is not limited to a process of operating the drive circuit of the motor 72. For example, the process may be a process of operating a device for locking the rotation angle of the motor described in the column of "Regarding Opening and Closing Actuator", when such device is provided.

The prevention process is not limited to the process of controlling the total rotation amount Ntot. For example, the prevention process may be a process of reducing the output of the motor 72 when the total rotation amount Ntot reaches the threshold Nth. This process can be implemented, for example, by reducing the effective value of the voltage applied to the motor 72 when the total rotation amount Ntot reaches the threshold Nth.

Regarding Purpose of Voltage Gradual Change Process

In the above embodiment, the process of S22 is executed in order to prevent a noise generated by the coupling member 60 due to the pull-in operation, but the embodiment disclosed here is not limited thereto. For example, as long as the coupling member 32 has a hinge structure and a noise may be generated due to the pull-in operation, the process of S22 may be executed as a countermeasure.

A purpose of the process of S22 is not necessarily to prevent the noise generated in the coupling member having the hinge structure. For example, the purpose may be to prevent the noise when the noise may be generated due to contact between the guide roller support portion 66 and the sliding door 20.

Regarding Opening and Closing Body

The opening and closing body is not limited to the sliding door 20 that opens and closes the opening portion 14 through which a person enters and exits the vehicle 10. For example, the opening and closing body may be a sliding sunroof. Further, the opening and closing body is also not limited to a sliding-type door. For example, the opening and closing body may be a so-called flip-up type back door that rotates with an upper end portion of the opening portion as the rotation shaft. In this case as well, when the opening portion is provided with the sealing member, performing the pull-in process when the lock is released is effective in reducing the noise associated with the release of the lock. In that case, it is effective to include the prevention process in the pull-in process in order to prevent the back door from being further displaced in the fully closed direction during the pull-in process due to aging variation of the sealing member.

Regarding Opening and Closing Actuator

For example, a device that locks the rotation angle of the motor 72 to the predetermined angle may be provided.

Regarding Motor

The motor is not limited to a brushless synchronous machine. For example, the motor may be an induction machine. Further, the polyphase brushless motor is not limited to the three-phase brushless motor. Further, the motor is not limited to the polyphase brushless motor, and may be, for example, a DC motor.

Regarding Release Control Device

The release control device is not limited to a device provided with the CPU 82 and the ROM 84 to execute a software process. For example, a dedicated hardware circuit such as an ASIC that hardware-processes at least a part of software-processing in the above embodiment may be provided. That is, the release control device may have any one of the following configurations (a) to (c). (a) The release control device includes a processing device that executes all of the above processes in accordance with a program, and a program storage device such as a ROM that stores the program. (b) The release control device includes a processing device that executes a part of the above processes in accordance with a program, a program storage device, and a dedicated hardware circuit that executes the remaining processes. (c) The release control device includes a dedicated hardware circuit that executes all of the above processes. Here, the software execution device including a processing device and a program storage device and the dedicated hardware circuit may be plural.

Solution to Problem

Hereinafter, solutions to the above problem and effects thereof will be described.

1. A lock release control device for an opening and closing body is configured to control an opening and closing body that opens and closes an opening portion of a vehicle. The opening and closing body comes into contact with a sealing member provided on a vehicle body side of the vehicle in a fully closed state. The vehicle includes a locking device and an opening and closing actuator. The locking device is a device that restrains the opening and closing body in a fully closed position. The opening and closing actuator is an actuator that displaces the opening and closing body by rotation of a motor to change the opening and closing body from one of two states including an open state and a closed state to another of the states. The lock release control device is configured to execute an open command acquisition process, a pull-in process, and a lock release process. The open command acquisition process is a process of acquiring a command to bring the opening and closing body to the open state. The pull-in process includes a closing rotation process of controlling the rotation of the motor to further displace the opening and closing body in a closing direction when the command to bring the opening and closing body to the open state is acquired, and at least one process of a voltage gradual change process or a prevention process. The lock release process is a process of operating the locking device to release restraint of the opening and closing body at the fully closed position when the command to bring the opening and closing body to the open state is acquired. The voltage gradual change process is a process of gradually increasing a voltage applied to the motor upon start of the closing rotation process. The prevention process is a process of preventing further displacement of the opening and closing body when the motor rotates by a predetermined amount due to the closing rotation process.

According to the above configuration, when the lock is released, the opening and closing body is pressed against the sealing member by the closing rotation process. Therefore, a force exerted on the opening and closing body by the sealing member can be reduced by the closing rotation process. Therefore, the force required when the locking device releases a locked state is reduced as compared with a case where the closing rotation process is not executed. Accordingly, it is possible to reduce a noise generated when the locked state is released.

However, when the opening and closing body is further displaced to a closing side due to the closing rotation process, a user may feel a sense of discomfort through sight or hearing. For example, when the opening and closing body is displaced to the closing side with respect to the fully closed position, members other than the sealing member may come into contact with each other and generate a noise. Further, when the opening and closing body is largely displaced to the closing side, the user may perceive that the opening and closing body is displaced to a direction opposite to an intended direction even though an open command is issued.

On the other hand, according to the voltage gradual change process, it is possible to reduce an acceleration when the opening and closing body is displaced to the closing side. Therefore, it is possible to prevent an impact when the members other than the sealing member come into contact with each other when the opening and closing body is displaced to the closing side with respect to the fully closed position. Therefore, it is possible to reduce the noise generated due to the opening and closing body being displaced to the closing side with respect to the fully closed position. According to the prevention process, it is possible to prevent the opening and closing body from being largely displaced to the closing side.

2. In the lock release control device for an opening and closing body according to the above aspect 1, the opening and closing body is a sliding door. The vehicle includes a guide rail and a coupling member. The guide rail is coupled to a vehicle body. The coupling member couples the guide rail and the opening and closing body, and includes a guide roller, a guide roller support portion, and a fixing portion. The guide roller is a member that is displaced while rotating along the guide rail. The guide roller support portion is a member that supports a rotation shaft of the guide roller. The fixing portion is coupled to the opening and closing body. The guide roller support portion and the fixing portion are rotatable relative to each other along the same shaft. A closing-side facing surface of the guide roller and a closing-side facing surface of the fixing portion face each other in the closed state of the opening and closing body, and have an angle between each other that increases as the opening and closing body is displaced to the open state. The pull-in process includes the voltage gradual change process.

According to the above configuration, when the opening and closing body is displaced to the closing side due to the closing rotation process, the closing-side facing surface of the guide roller and the closing-side facing surface of the fixing portion may come into contact with each other. At this time, when a relative displacement speed between the closing-side facing surface of the guide roller and the closing-side facing surface of the fixing portion is large, a noise that causes the user to feel a sense of discomfort may be generated. On the other hand, according to the above voltage gradual change process, the relative displacement speed generated by the closing rotation process can be reduced as compared with a case where the voltage applied to the motor is increased stepwise. Therefore, it is possible to reduce the noise generated by the contact between the closing-side facing surface of the guide roller and the closing-side facing surface of the fixing portion.

3. In the lock release control device for an opening and closing body according to the above aspect 2, a voltage of a DC voltage source is applied to a terminal of the motor via a switching element. The voltage gradual change process is a process of gradually increasing a time ratio of an on operation period to one cycle of on and off operations of the switching element.

According to the above configuration, an effective value of the voltage applied to the motor can be gradually increased by gradually increasing the time ratio.

4. In the lock release control device for an opening and closing body according to any one of the above aspects 1 to 3, the pull-in process includes the prevention process.

According to the above configuration, since the pull-in process includes the prevention process, it is possible to prevent the opening and closing body from being largely displaced to the closing side.

5. In the lock release control device for an opening and closing body according to the above aspect 4, the motor is a polyphase brushless motor, and is applied with an output voltage of an inverter. The prevention process is a process of fixing a switching element of the inverter corresponding to each of a first phase of an upper arm and a second phase of a lower arm to an on state when the motor rotates by the predetermined amount due to the closing rotation process.

According to the above configuration, since a state in which a current flows from the first phase of the upper arm to the second phase of the lower arm is continued, a torque for fixing a rotation angle of the motor to a predetermined angle is generated. Therefore, it is possible to prevent the motor from excessively rotating to the closing side of the opening and closing body.

6. In the lock release control device for an opening and closing body according to the above aspect 4, the prevention process is a process of feedback-controlling a rotation amount by which the motor rotates due to the closing rotation process.

According to the above configuration, since the rotation amount of the motor is feedback-controlled, it is possible to prevent the motor from rotating to the closing direction of the opening and closing body by an amount greatly exceeding the predetermined amount.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A lock release control device for an opening and closing body configured to control an opening and closing body that opens and closes an opening portion of a vehicle, wherein the opening and closing body comes into contact with a sealing member provided on a vehicle body side of the vehicle in a fully closed state, the vehicle includes a locking device and an opening and closing actuator, the locking device is a device that restrains the opening and closing body in a fully closed position, the opening and closing actuator is an actuator that displaces the opening and closing body by rotation of a motor to change the opening and closing body from one of two states including an open state and a closed state to another of the states, the lock release control device is configured to execute an open command acquisition process, a pull-in process, and a lock release process, the open command acquisition process is a process of acquiring a command to bring the opening and closing body to the open state, the pull-in process includes a closing rotation process of controlling the rotation of the motor to further displace the opening and closing body in a closing direction when the command to bring the opening and closing body to the open state is acquired, and at least one process of a voltage gradual change process or a prevention process, the lock release process is a process of operating the locking device to release restraint of the opening and closing body at the fully closed position when the command to bring the opening and closing body to the open state is acquired, the voltage gradual change process is a process of gradually increasing a voltage applied to the motor upon start of the closing rotation process, and the prevention process is a process of preventing further displacement of the opening and closing body when the motor rotates by a predetermined amount due to the closing rotation process.

2. The lock release control device for an opening and closing body according to claim 1, wherein the opening and closing body is a sliding door, the vehicle includes a guide rail and a coupling member, the guide rail is coupled to a vehicle body, the coupling member couples the guide rail and the opening and closing body, and includes a guide roller, a guide roller support portion, and a fixing portion, the guide roller is a member that is displaced while rotating along the guide rail, the guide roller support portion is a member that supports a rotation shaft of the guide roller, the fixing portion is coupled to the opening and closing body, the guide roller support portion and the fixing portion are rotatable relative to each other along the same shaft, a closing-side facing surface of the guide roller and a closing-side facing surface of the fixing portion face each other in the closed state of the opening and closing body, and have an angle between each other that increases as the opening and closing body is displaced to the open state, and the pull-in process includes the voltage gradual change process.

3. The lock release control device for an opening and closing body according to claim 2, wherein a voltage of a DC voltage source is applied to a terminal of the motor via a switching element, and the voltage gradual change process is a process of gradually increasing a time ratio of an on operation period to one cycle of on and off operations of the switching element.

4. The lock release control device for an opening and closing body according to claim 1, wherein the pull-in process includes the prevention process.

5. The lock release control device for an opening and closing body according to claim 4, wherein the motor is a polyphase brushless motor, and is applied with an output voltage of an inverter, and the prevention process is a process of fixing a switching element of the inverter corresponding to each of a first phase of an upper arm and a second phase of a lower arm to an on state when the motor rotates by the predetermined amount due to the closing rotation process.

6. The lock release control device for an opening and closing body according to claim 4, wherein the prevention process is a process of feedback-controlling a rotation amount by which the motor rotates due to the closing rotation process.

* * * * *